United States Patent
Apichom

(10) Patent No.: US 6,338,318 B1
(45) Date of Patent: Jan. 15, 2002

(54) COMBINATION CAT CARRIER AND CAT ORGANIZER DEVICE AND METHOD OF USE

(76) Inventor: Surasak Apichom, 2125 Ohio Ave., #G, Signal Hill, CA (US) 90804

( * ) Notice: Subject to any disclaimer, the term of this patent is extended or adjusted under 35 U.S.C. 154(b) by 0 days.

(21) Appl. No.: 09/590,944

(22) Filed: Jun. 9, 2000

(51) Int. Cl.[7] .................................................. A01K 1/02
(52) U.S. Cl. ........................ 119/497; 119/453; 119/479
(58) Field of Search .............................. 119/497, 453, 119/458, 462, 479, 482, 484, 501, 161, 165

(56) References Cited

U.S. PATENT DOCUMENTS

| | | |
|---|---|---|
| 3,100,474 A | 8/1963 | Schneider |
| 3,771,686 A * | 11/1973 | Brison ........................ 220/4.21 |
| 3,791,347 A * | 2/1974 | Lovell ........................ 119/497 |
| D255,518 S | 6/1980 | Logsdon |
| 4,858,561 A | 8/1989 | Springer |
| 5,092,270 A | 3/1992 | Simons |
| 5,220,886 A | 6/1993 | Hyde |
| 5,503,107 A | 4/1996 | Satcher |
| 5,678,509 A | 10/1997 | Dillon |
| 5,785,000 A | 7/1998 | Barbary |
| D396,578 S | 8/1998 | Zaidman |
| 5,791,292 A * | 8/1998 | Jempolsky ................... 119/497 |
| 5,931,120 A | 8/1999 | Burns |
| 5,964,190 A * | 10/1999 | Willinger et al. ........... 119/500 |
| 6,250,529 B1 * | 6/2001 | Babbitt et al. ............... 224/401 |

FOREIGN PATENT DOCUMENTS

DE WO 93/22904 11/1993

* cited by examiner

*Primary Examiner*—Charles T. Jordan
*Assistant Examiner*—Yvonne R. Abbott
(74) *Attorney, Agent, or Firm*—Eric Karich

(57) ABSTRACT

A combination cat carrier and cat organizer device for supporting a litter box above a ground surface, for organizing a plurality of cat-related paraphernalia, and for transporting a cat has a cat carrier and at least one drawer matchbox unit. The cat carrier has a carrier top and a carrier bottom connected by a carrier sidewall. The carrier sidewall has a carrier opening through which a cat can enter and exit the cat carrier, except as restricted by a gate hingably attached to the cat carrier. The at least one drawer matchbox unit has a drawer and a drawer sleeve. The plurality of cat-related paraphernalia is placed into the at least one drawer and the drawer is inserted into the at least one drawer sleeve, thereby creating at least one drawer matchbox unit, which can be inserted into the carrier opening for storage.

3 Claims, 2 Drawing Sheets

COMBINATION CAT CARRIER AND CAT ORGANIZER DEVICE AND METHOD OF USE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to cat carrying devices, and more particularly to a cat carrier that also functions as a cat organizer device and a litter box support base.

2. Description of Related Art

Many cat owners use a large number of cat-related products and paraphernalia in the maintenance of their beloved pet. Common products include a kitty-litter box, a bag of kitty litter, a sifter for cleaning the kitty litter, plastic bags for disposing of dirty kitty litter, and various cat toys. Organizing these products requires valuable space that many people do not have in their home.

Actually cleaning kitty litter is also a difficult and annoying task. One problem with cleaning kitty litter is that the kitty-litter box is commonly located on the ground and requires the user to kneel down to sift and clean the kitty-litter box.

Finally, cat owners usually have to own a cat carrier to transport their cat. Cat carriers tend to be large, rigid plastic boxes that take up a great deal of space. Although they are rarely used, they must be stored somewhere in the house or garage, taking up space and presenting an eyesore wherever it is placed.

The prior art teaches various drawers for organizing as well as cat carriers for carrying cats. However, the prior art does not teach a combination cat carrier and cat organizer device for supporting a litter box above a ground surface and for organizing a plurality of cat-related paraphernalia within the cat carrier when the cat carrier is not in use. The present invention fulfills these needs and provides further related advantages as described in the following summary.

SUMMARY OF THE INVENTION

The present invention teaches certain benefits in construction and use which give rise to the objectives described below.

The present invention provides a combination cat carrier and cat organizer device for supporting a litter box above a ground surface, for organizing a plurality of cat-related paraphernalia, and for transporting a cat. The combination includes a cat carrier and at least one drawer matchbox unit. The cat carrier has a carrier top and a carrier bottom connected by a carrier sidewall. The carrier sidewall has a carrier opening through which a cat can enter and exit the cat carrier, except as restricted by a gate hingably attached to the cat carrier. The at least one drawer matchbox unit has a drawer and a drawer sleeve. The plurality of cat-related paraphernalia is placed into the at least one drawer and the drawer is inserted into the at least one drawer sleeve, thereby creating at least one drawer matchbox unit, which can be inserted into the carrier opening for storage.

A primary objective of the present invention is to provide combination cat carrier and cat organizer device having advantages not taught by the prior art.

Another objective is to provide a cat carrier that supports a litter box above a ground surface so that a user does not have to bend over to clean the litter box.

A further objective is to provide a cat carrier that can also be used to store a plurality of cat-related paraphernalia in at least one drawer matchbox unit.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
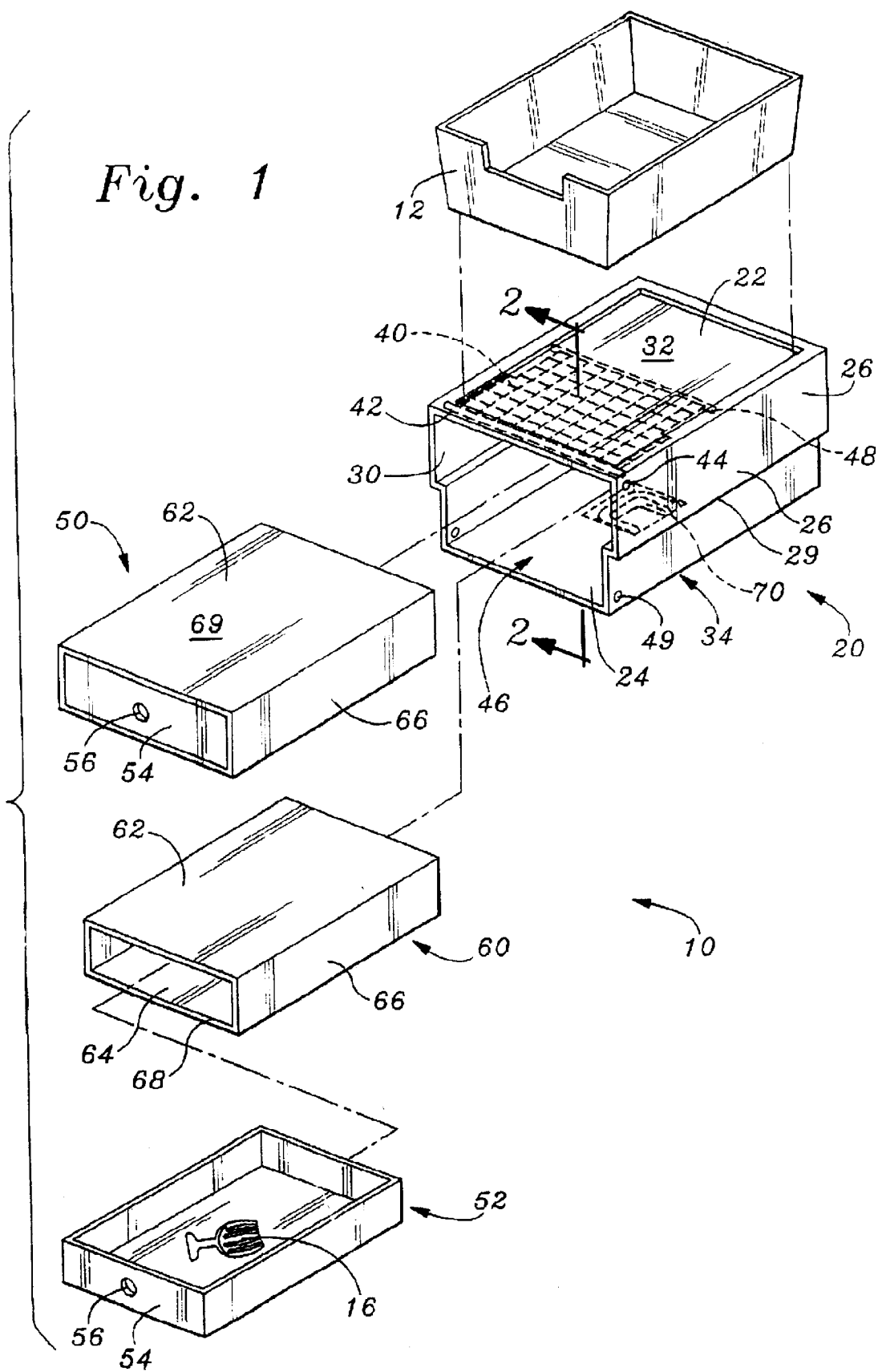
FIG. 1 is an exploded perspective view of the preferred embodiment of the present invention, a combination cat carrier and cat organizer device for supporting a litter box.
Figure 2:
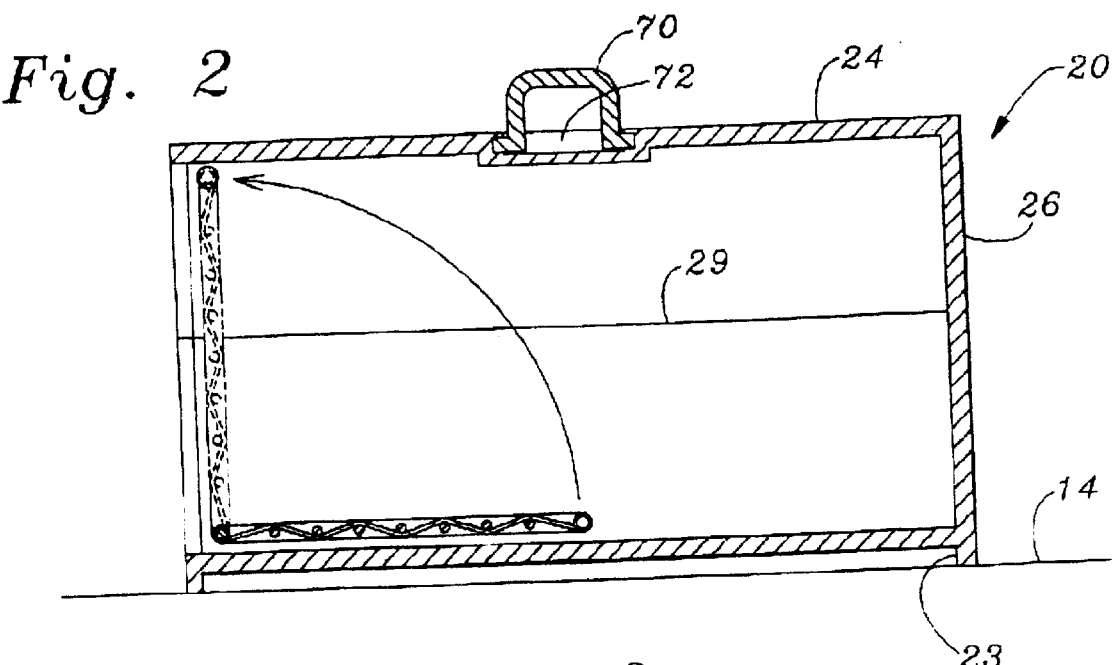
FIG. 2 is a sectional view thereof taken along line 2—2 in FIG. 1.

The above described drawing figures illustrate the invention, a combination cat carrier and cat organizer device 10 for supporting a litter box 12 above a ground surface 14 and for organizing a plurality of cat-related paraphernalia 16. The combination includes a cat carrier 20 and at least one drawer matchbox unit 50.

As shown in FIG. 1, the cat carrier 20 has a carrier top 22 and a carrier bottom 24 connected by a carrier sidewall 26. The cat carrier 20 is constructed of a fairly rigid, self-supporting material that is capable of containing a cat and also supporting the litter box 12 when it is full of litter. The carrier sidewall 26 has a carrier opening 30 through which a cat can enter and exit the cat carrier 20. The carrier bottom 24 is shaped to support the cat carrier 20 upon the ground surface 14. The cat carrier 20 is sized and shaped to support the litter box 12 above the ground surface 14 upon a carrier top surface 32.

Figure 3:
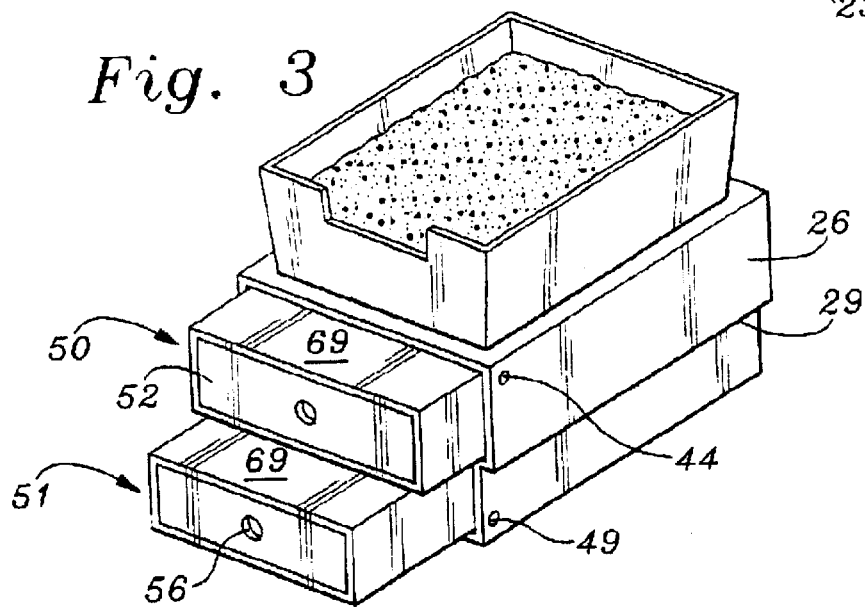
FIG. 3 is a perspective view thereof showing a pair of drawer matchbox units arranged as steps for use by a cat.
Figure 4:
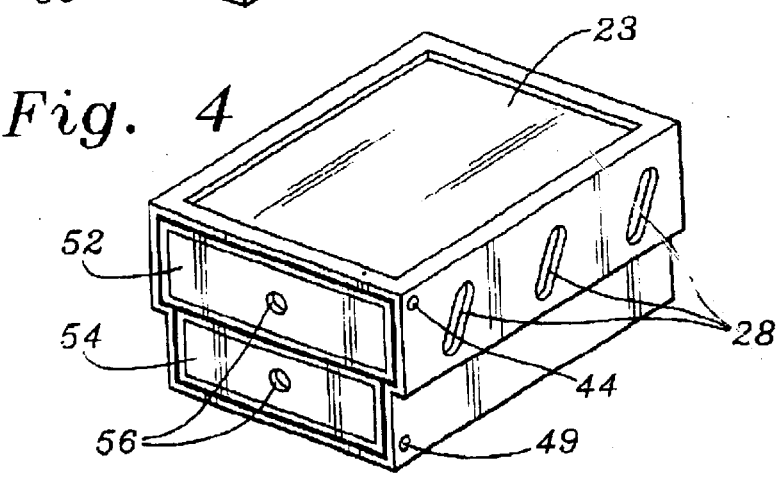
FIG. 4 is a perspective view thereof showing the pair of drawer matchbox units positioned within the cat carrier.

The cat carrier 20 is preferably a molded plastic box 18 inches long, 13 inches wide, and 13 inches tall. It is preferred that the carrier bottom 24 be somewhat smaller than the carrier top 22 to facilitate carrying the cat carrier 20, as described below. It is also preferred that the carrier top surface 32 include a molded contour 23 shaped to help maintain the litter box 12 on top of the cat carrier 20. In the most preferred embodiment shown in FIG. 3, the carrier top surface 32 is only slightly larger than the litter box 12, so that there is no overhang upon which the cat can stand, thereby forcing the cat to use the at least one drawer matchbox unit 50 to climb into the litter box 12. As shown in FIG. 4, the carrier sidewall 26 can also include a plurality of ventilation holes 28 to increase ventilation and reduce the weight of the cat carrier 20.

The cat carrier 20 further includes a gate 40 hingably attached to the cat carrier 20 to pivot between an open position in which the gate 40 does not cover the carrier opening 30, and a closed position in which the gate 40 substantially covers the carrier opening 30, meaning that the gate 40 covers the carrier opening 30 enough to prevent the cat from escaping from the cat containing area 46. The gate 40 is preferably hingably attached to the carrier sidewall 26 with a pivot bar 42 positioned though a pair of pivot holes 44, although many types of acceptable hinges can be devised by those skilled in the art. The gate 40 is preferably constructed of a rigid material having many holes to facilitate ventilation, such as a wire lattice or a plastic sheet having many holes punched therethrough. However, if the carrier sidewall 26 provides for adequate ventilation, it is not required that the gate 40 provide for ventilation. It is also not required that the gate 40 be constructed of a rigid material. If the gate 40 is constructed of a fabric of other flexible sheet, the flexibility of the fabric provides both the hinge and the ventilation.

The carrier top 22, the carrier bottom 24, the carrier sidewall 26, and the gate 40 cooperating to define a cat containing area 46 when the gate 40 is in the closed position. While it is necessary that the cat containing area 46 provided by the cat carrier 20 be safe and comfortable for the cat, this can obviously be provided in many ways without altering the spirit of the current invention.

The cat carrier 20 further includes a means for locking 48 the gate 40 in the closed position. Many locking mechanisms can be devised by those skilled in the art without altering the spirit of this invention. In the preferred embodiment, the gate 40 is hingably attached to the carrier sidewall 26 on either side of the carrier opening 30; and the means for locking 48 the gate 40 includes a pair of spring-biased locking pins located on either side of the gate 40. The pair of spring-biased locking pins each engage one a pair of locking apertures 49 in the carrier sidewall 26. If the gate 40 is constructed of flexible material, it is preferred that the means for locking 48 the gate 40 be provided by a zipper (not shown) removably connecting the gate 40 to the carrier opening 30. Various additional mechanisms suitable for this purpose are disclosed in Burns et al, U.S. Pat. No. 5,931,120, Satcher et al., U.S. Pat. No. 5,503,107, and Simons et al., U.S. Pat. No. 5,092,270, hereby incorporated by reference in full.

As shown in FIG. 1, the at least one drawer matchbox unit 50 has a drawer 52 and a drawer sleeve 60. The drawer 52 is provided by any shaped structure designed to receive and contain the plurality of cat-related paraphernalia 16. The drawer 52 preferably includes a front drawer wall 54 having a finger hole 56. The front drawer wall 54 prevents the plurality of cat-related paraphernalia 16 from falling out of the at least one drawer matchbox unit 50. The finger hole 56 allows the user to insert his or her finger (not shown) through the finger hole 56 to grasp the front drawer wall 54 to slide the drawer 52 out of the drawer sleeve 60. Alternatively, the finger hole 56 also allows the user to grasp both the front drawer wall 54 and the drawer sleeve 60 to remove the at least one drawer matchbox unit 50 in its entirety.

The drawer sleeve 60 has a sleeve top 62 and a sleeve bottom 64 connected by a sleeve sidewall 66. The sleeve sidewall 66 has a sleeve opening 68 shaped to receive the drawer 52. In use, the drawer 52 is positioned within the sleeve opening 68 to form the at least one drawer matchbox unit 50. The at least one drawer matchbox unit 50 functions to contain the plurality of cat-related paraphernalia 16 within the drawer 52 even when the at least one drawer matchbox unit 50 is removed from the cat carrier 20.

In the preferred embodiment, the combination includes two drawer matchbox units 50. In the preferred embodiment, as shown in FIG. 3, the sleeve top 62 of the drawer sleeve 60 of each of the drawer matchbox units 50 further provides a sleeve top surface 69. In this embodiment, the two drawer matchbox units 50 can be partially removed from the cat carrier 20 so that the sleeve top surfaces 69 of the drawer matchbox units 50 cooperate to form stairs leading up to the carrier top 22 of the cat carrier 20.

In this preferred embodiment, the carrier sidewall 26 has a rail 29 extending the length of the cat carrier 20 on either side of the cat containing area 46. The rail 29 serves to independently support the drawer matchbox unit 50 that is placed on top of the other drawer matchbox unit 50. The rail 29 is not required, however, and the drawer matchbox units 50 function quite well if they are simply rested on top of each other.

In the preferred embodiment, the cat carrier 20 further includes a handle 70 pivotally attached to the carrier bottom 24 within a recess 72 in a carrier bottom surface 34. The handle 70 is designed to pivot from a stored position in which the handle 70 is located within the recess 72 roughly parallel to the carrier bottom surface 34, to a vertical position in which the handle 70 extends above and roughly perpendicular to the carrier bottom surface 34. In use, the handle 70 is within the recess 72 and out of the way while the cat carrier 20 is used to support the litter box 12. When the user wishes to transport the cat, the user simply inverts the cat carrier 20, inserts the cat, closes and locks the gate 40, pivots the handle 70 to the vertical position, and then lifts the cat carrier 20 by the handle 70. It is worth noting that it is not required that the handle 70 be located on the carrier bottom surface 34 as shown the present preferred embodiment. It is also possible to located the handle 70 on the carrier top surface 32, or even on the carrier sidewall 26.

The invention includes a method for using the cat carrier 20 described above for storing the plurality of cat related paraphernalia 16 and simultaneously supporting the litter box 12 operably positioned for use by a cat. The method further includes carrying the cat using the cat carrier 20.

First, the plurality of cat-related paraphernalia 16 is placed into the at least one drawer 52 and the drawer 52 is inserted into the at least one drawer sleeve 60, thereby creating at least one drawer matchbox unit 50. As described above, there are preferably two drawer matchbox units 50, each of the drawer matchbox units 50 providing room for storage of the plurality of cat-related paraphernalia 16, such as strainers for cleaning the litter, cat toys, and other items described above. The gate 40 is then positioned in the open position by pivoting the gate 40 until it is parallel to the carrier top 22. In this configuration, the drawer matchbox units 50 can be inserted into the carrier opening 30 of the cat carrier 20. It is preferred that the drawer matchbox units 50 be inserted only partially into the carrier opening 30, so that the sleeve top surfaces 69 of the drawer matchbox units 50 cooperate to form stairs leading up to the carrier top 22 of the cat carrier 20, as described above and as shown in FIG. 4. The cat litter box 12 is then positioned on the cat carrier 20 for use by the cat.

The cat carrier 20 will likely remain in this configuration for most of the time, with the user occasionally opening the drawer matchbox units 50 to remove, use, and replace the plurality of cat-related paraphernalia 16. The cat is able to climb into the litter box 12 using the drawer matchbox units 50. Importantly, the user is assisted in cleaning the litter box 12 because the litter box 12 is not located on the ground surface 14, but is supported on the cat carrier 20 substantially above the ground surface 14. This is particularly important for the elderly or disabled, who may not be able to bend over to clean the litter box 12 without the risk of physical injury.

When the need arises to travel, the cat litter box 12 is removed from the cat carrier 20; and the drawer matchbox units 50 are removed from the cat containing area 46. The plurality of cat-related paraphernalia 16 does not spill out of the drawers 52 when the drawer matchbox units 50 are removed because the drawer sleeves 60 positioned around each of the drawers 52 prevent the plurality of cat-related paraphernalia 16 from escaping. In the preferred embodiment, the cat carrier 20 is inverted so that the carrier top surface 32 is moved to contact the ground surface 14 and provide a more stable carrying unit, as well as to expose the handle 70 for use. Once the drawer matchbox units 50 are removed and the cat carrier 20 is positioned for use, the cat is inserted into the cat carrier 20 and the gate 40 is moved to the closed position locked in the closed position. Of course, while we refer to cats throughout this application, the cat carrier 20 is equally useful for dogs and other animals, and the application should in no way be restricted to a specific type of animal.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A combination cat carrier and cat organizer device for supporting a litter box above a ground surface and for organizing a plurality of cat-related paraphernalia, the combination comprising:

a cat carrier having a carrier top and a carrier bottom connected by a carrier sidewall, the carrier sidewall having a carrier opening, the carrier bottom being shaped to support the cat carrier upon the ground surface;

a carrier top surface provided by the carrier top, the cat carrier being sized and shaped to support the litter box upon the carrier top surface above the ground surface;

a gate hingably attached to the cat carrier to pivot between an open position in which the gate does not cover the carrier opening, and a closed position in which the gate substantially covers the carrier opening;

the carrier top, the carrier bottom, the carrier sidewall, and the gate cooperating to define a cat containing area when the gate is in the closed position;

a means for locking the gate in the closed position;

at least one drawer matchbox unit having a drawer and a drawer sleeve, the drawer sleeve having a sleeve top and a sleeve bottom connected by a sleeve sidewall, the sleeve sidewall having a sleeve opening shaped to receive the drawer, the drawer being positioned within the sleeve opening; and a sleeve top surface provided by the sleeve top of the drawer sleeve of the at least one drawer matchbox unit.

2. The combination of claim 1 further comprising a handle pivotally attached to the carrier bottom within a recess in a carrier bottom surface, the handle pivoting from a stored position in which the handle is located within the recess roughly parallel to the carrier bottom surface, to a vertical position in which the handle extends above and roughly perpendicular to the carrier bottom surface.

3. A method for storing a plurality of cat related paraphernalia and simultaneously storing a cat litter box operably positioned for use by a cat, and for then carrying the cat, the method comprising the steps of:

a) providing a combination cat carrier and organizer comprising:
      a cat carrier having a carrier top and a carrier bottom connected by a carrier sidewall, the carrier sidewall having a carrier opening;
      a gate hingably attached to the cat carrier to pivot between an open position in which the gate does not cover the carrier opening, and a closed position in which the gate substantially covers the carrier opening; and
      at least one drawer and at least one drawer sleeve, the at least one drawer sleeve having a sleeve top and a sleeve bottom connected by a sleeve sidewall, the sleeve sidewall having a sleeve opening shaped to receive the at least one drawer;

b) placing the plurality of cat-related paraphernalia into the at least one drawer;

c) inserting the at least one drawer into the at least one drawer sleeve, thereby creating at least one drawer matchbox unit;

d) positioning the gate in the open position;

e) inserting the at least one drawer matchbox unit partially into the carrier opening of the cat carrier;

f) positioning the cat litter box on the cat carrier for use by the cat;

g) removing the cat litter box and the at least one drawer matchbox unit;

h) inserting the cat into the cat carrier;

i) moving the gate to the closed position; and j) locking the gate in the closed position.

* * * * *